United States Patent
Carlson et al.

(10) Patent No.: US 8,671,132 B2
(45) Date of Patent: Mar. 11, 2014

(54) SYSTEM, METHOD, AND APPARATUS FOR POLICY-BASED DATA MANAGEMENT

(75) Inventors: James Vernon Carlson, San Jose, CA (US); Linda Marie Duyanovich, Saratoga, CA (US); Toby Lyn Marek, Santa Clara, CA (US); David Ronald Nowlen, Morgan Hill, CA (US); David Allan Pease, Redwood Estates, CA (US); Michael Leo Walker, San Jose, CA (US); Paul Harold Hilton, Bragg Creek (CA)

(73) Assignee: International Business Machines Corporation, Armonk, NY (US)

( * ) Notice: Subject to any disclaimer, the term of this patent is extended or adjusted under 35 U.S.C. 154(b) by 2908 days.

(21) Appl. No.: 10/389,408

(22) Filed: Mar. 14, 2003

(65) Prior Publication Data
US 2004/0199566 A1    Oct. 7, 2004

(51) Int. Cl.
*G06F 15/16* (2006.01)
(52) U.S. Cl.
USPC ........................... 709/201; 709/203; 709/208
(58) Field of Classification Search
USPC ...................................... 707/1; 709/208, 207
See application file for complete search history.

(56) References Cited

U.S. PATENT DOCUMENTS

| | | | | |
|---|---|---|---|---|
| 4,755,928 | A | 7/1988 | Johnson et al. | 364/200 |
| 5,519,865 | A * | 5/1996 | Kondo et al. | 707/1 |
| 6,154,776 | A | 11/2000 | Martin | 709/226 |
| 6,167,445 | A | 12/2000 | Gai et al. | 709/223 |
| 6,212,562 | B1 | 4/2001 | Huang | 709/227 |
| 6,594,689 | B1 * | 7/2003 | Nowatzki et al. | 709/208 |

* cited by examiner

*Primary Examiner* — Adnan Mirza
(74) *Attorney, Agent, or Firm* — Kunzler Law Group

(57) ABSTRACT

A policy-based data management system, method, and apparatus are disclosed. The system, method, and apparatus are configured to operate over a distributed storage system such as a storage area network (SAN). Files to be stored on the network are each assigned a service class and a storage pool based on the application of policies to file attributes such as file name, type, user, etc. The service class and storage pool designations are stored as metadata. Files may be retrieved using the metadata to identify the storage pool where the file is stored, and the service class listed within the metadata may be used to control the manner in which the file is handled. A metadata server may be utilized to provide the appropriate service class of files in response to requests from remote clients that may be of different computing platforms.

27 Claims, 8 Drawing Sheets

SYSTEM, METHOD, AND APPARATUS FOR POLICY-BASED DATA MANAGEMENT

BACKGROUND OF THE INVENTION

1. The Field of the Invention

The invention relates to networking and data storage. More particularly, the invention relates to a system and method for policy-based data management on a distributed storage system.

2. The Relevant Art

Networks have become instrumental in situations in which data is transferred from one computer to another, or from clients such as an independent workstation to a centralized storage facility. It is common for storage applications to have very specialized needs. In response to these needs, distributed storage systems have been developed. One type of distributed storage system is a storage area network (SAN). A distributed storage system typically has a plurality of clients connected to a plurality of storage pools. The clients of the distributed storage system may, in some cases, be servers that transmit data between the distributed storage system and individual computers.

Unfortunately, a number of storage related issues have not yet been successfully addressed by known distributed storage system configurations. A distributed storage system is often called upon to carry out several different operations simultaneously. Consequently, the resources of the distributed storage system, or of a server connected to the distributed storage system, can easily become saturated, particularly when many users wish to simultaneously store, retrieve, or move data on the distributed storage system.

Additionally, many known distributed storage systems have no method of prioritizing operations. Consequently, a low-importance, high resource operation, such as a bulk file transfer, may preempt memory, caching space, input/output (I/O) bandwidth, processor capacity, or other resources that are needed for more important operations. Thus, performance of the more important operations is unnecessarily delayed.

Also, current distributed storage systems are not capable of storing data using prioritized operations within multiple platforms. Typically, all of the computers on a distributed storage system must have the same type of operating system. If data from multiple platforms are to be stored, the data must be routed through multiple distributed storage systems and stored in different locations.

Furthermore, known distributed storage systems generally do not permit a user to automatically select between multiple storage options when generating files. Nor do these systems account for the different requirements placed on these files. Specifically, different files may have different requirements for accessibility, disaster recoverability, retrieval speed, retrieval consistency, and storage format. Some files may need to be accessed by many people simultaneously, while others are only used rarely, by a single user. Some files are "mission critical," and therefore must not be lost if hardware damage occurs; others are more expendable. Similarly, some files must be accessed rapidly and/or transferred at a consistent, rapid data transfer rate, while others do not require rapid access. Certain file types, such as database files, are advantageously stored in a "sparse" format that permits subsequent expansion, while other files can be densely packed together.

By the same token, great variation exists in the equipment available to store data. In general, greater capacity, greater access speed, higher throughput, and higher disaster recoverability equate to higher cost. Without a variety of options for data storage, some files are stored in a manner that provides insufficient performance, and others take up comparatively expensive storage capacity that provides an unnecessarily expensive level of performance.

Consequently, what is needed is a comparatively simple and versatile system, method, and apparatus for managing data in a network according to predetermined policies. What is particularly needed is a data management system, method, and apparatus that prioritize files within the network, with clients that operate based on a plurality of different operating platforms. Further, what is particularly needed is a data management system, method, and apparatus that intelligently stores files in storage pools with a variety of performance levels based policies and the nature of the storage pools. Such a system, apparatus, and method would be particularly desirable if implemented for distributed storage systems that service clients operating under heterogeneous platforms.

BRIEF SUMMARY OF THE INVENTION

The system, method, and apparatus of the present invention have been developed in response to the present state of the art, and in particular, in response to the problems and needs in the art that have not yet been fully solved by currently available storage area network systems. Accordingly, the present invention has been developed to provide a policy-based data management system that overcomes many or all of the above-discussed shortcomings in the art.

In one embodiment, the data management system may be implemented in a network having a plurality of clients. The clients may be individual workstations or servers connected to workstations. Due to the nature of the invention, the clients need not all operate on the same platform. The clients may be connected to a local area network (LAN) and to a distributed storage system, which may take the form of a storage area network (SAN). One or more servers are also connected to the LAN and the SAN. The servers have, as one of their functions, the duty of assigning and distributing metadata for files on the system and will hereafter be referred to as "metadata servers." Additionally, a metadata disk or pool of disks may be connected to the metadata servers through a LAN or the SAN. One or more storage devices or pools of storage devices are preferably connected to the distributed storage system.

The data management system is, in one embodiment, policy-based. More precisely, the data management system preferably incorporates a policy set, which includes a service class policy and a storage pool policy. Each of the policies preferably includes a number of rules designed to select a service class and/or storage pool for a file based on attributes of the file. Service classes may be hierarchical, for example, platinum, gold, silver, or bronze, reflecting the relative importance of the data. Of course, the service classes may be assigned any combination of rules, and need not be hierarchical.

In one embodiment, each of the clients is provided with a file transmission module that is configured to transmit attributes of a file to the metadata server. A file evaluation module is preferably configured to apply the rules of the service class policy and the storage pool policy to the file attributes and the storage pool characteristics to automatically select a service class and a storage pool for the file. These may be added to the file attributes to create metadata for the file. The metadata is in one embodiment stored in the metadata disk pool, and the file is then stored in the selected storage pool.

Each of the clients is provided in one embodiment with a file request transmission module that is configured to transmit file request to the metadata server. A metadata retrieval module in one embodiment receives the translated metadata request and retrieves the metadata that corresponds to the file from the metadata disk pool. The file request transmission module receives the storage pool designation from the metadata for the file, and then transmits a file request to retrieve the file from the corresponding storage pool.

The file and the service class designation for the file are, in one embodiment, received by a file usage module in the client. The file usage module preferably uses the service class to determine the proper allocation of client assets, such as RAM allocation, performance priority, cache allocation scheme, and input/output (I/O) allocation.

The metadata may be stored in the form of a lookup table in the metadata disk pool. For example, file names or object identities related to unique files may be stored in the metadata disk pool, and each file name or object identity may be bound to the corresponding file metadata. Thus, the metadata server may retrieve the metadata for a file by locating the file name or object identity in the metadata disk pool, and reading the corresponding metadata.

According to one embodiment of a file storage and classification method operable in conjunction with the system described above, a policy set is provided and configured. A system administrator may configure the appropriate policy. Attributes of the file to be stored and classified are received by the metadata server, and the file attributes are translated from the native platform of the file to obtain translated attributes.

Based on the attributes, a service class and a storage pool are automatically selected for the file. Designations of the service class and storage pool may be added to the attributes of the file to provide the file metadata. The file metadata may be stored in the metadata disk pool, in the format described previously. The file may be stored in the selected storage pool.

The service class and the storage pool may be selected based on an application of the policy set. More precisely, the rules of the service class policy may be applied to determine the appropriate service class for the file. The rules may be analyzed in order until an appropriate classification is found. For example, the first rule of the service class policy may first be analyzed. If the file satisfies the conditions for the first rule, the file receives the service class that corresponds with the first rule. If the file does not satisfy the conditions for the first rule, the second rule is analyzed, and so on. If the file satisfies none of the rules, it receives a default service class.

If desired, the storage pool may be determined partially or solely by the service class. Thus, the rules of the storage pool policy may simply be based on the selected service class. Alternatively, the storage pool policy may involve criteria independent of the service class. The rules of the storage pool policy may be applied sequentially, in a manner similar to the rules of the service class policy. Because the storage pools typically vary in terms of speed, capacity, storage format, disaster recovery, and other factors, these characteristics are taken into account in selecting a storage pool. If the file satisfies none of the rules of the storage pool policy, the file is stored in a default storage pool.

According to one embodiment of a file retrieval and usage method, a file request is first received by the metadata server. Metadata for the requested file is then retrieved from the metadata disk pool. The metadata is preferably used to determine the appropriate storage pool. The requested file is then retrieved from the storage pool. In so doing, the metadata for the file is used to control the manner in which the file is handled, including its priority level with respect to other files.

In this manner, files are automatically assigned relative priority levels and locations. Higher priority file transactions are performed more expeditiously, and lower priority transmissions are not permitted to tie up undue resources. Furthermore, the files may be automatically assigned to storage locations that suit their need for rapid access, disaster recoverability, and the like.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
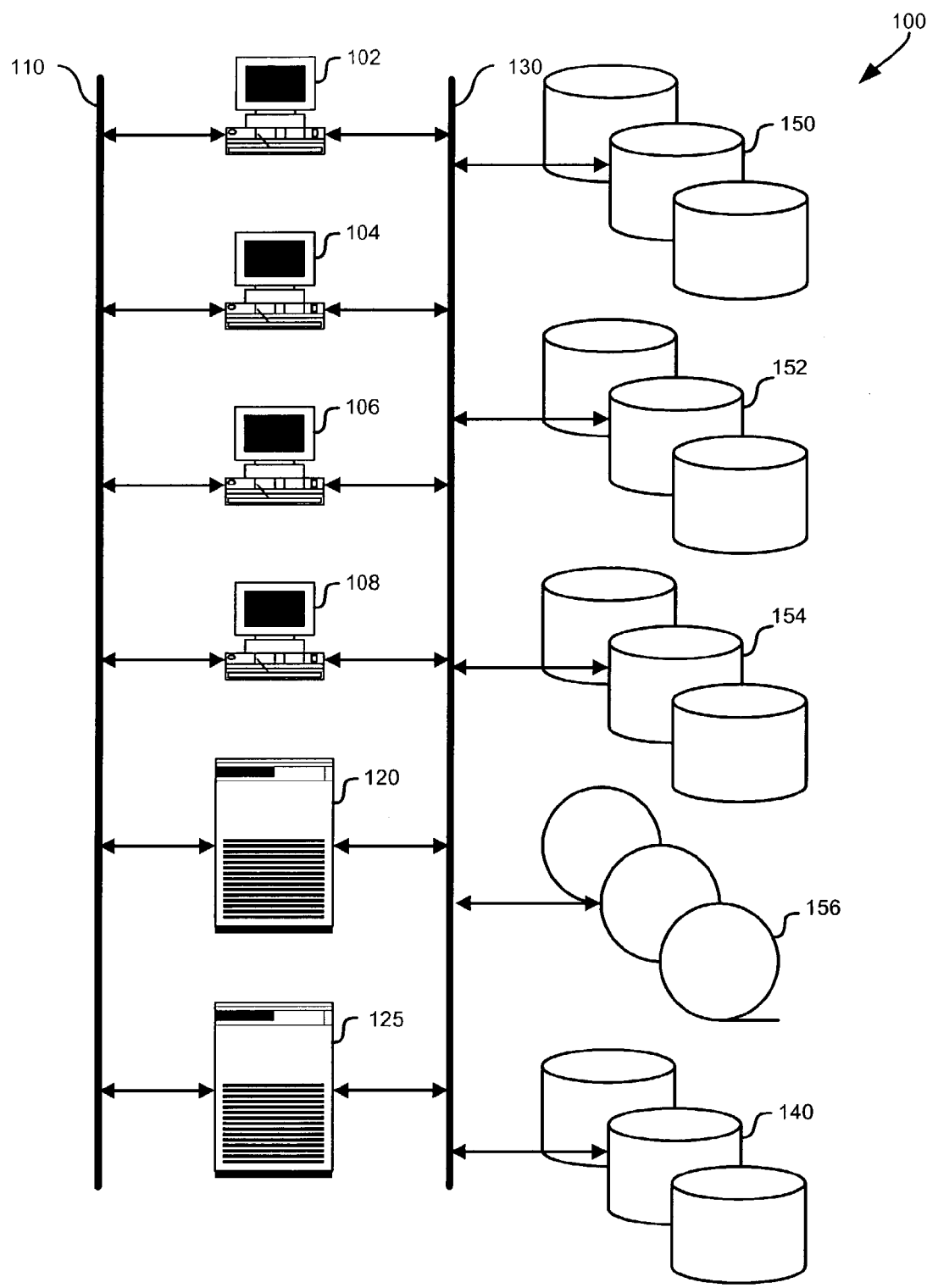
FIG. 1 is a schematic block diagram illustrating one embodiment of a network incorporating a policy based data management system within the scope of the present invention.

Referring to FIG. 1, a schematic block diagram is shown illustrating a representative network 100 suitable for use with the present invention. The network 100, as shown, includes a number of clients 102, 104, 106, 108. The clients 102, 104, 106, 108 may be workstations or servers communicating with workstations and in certain embodiments operate on a single platform or a plurality of different operating system platforms. For example, the client 102 may be Windows™ based, while the client 104 may be Solaris™ based, the client 106 may run based on AIX®, and the client 108 may be Linux-based. The network 100 is preferably configured to bear large amounts of traffic, particularly data packets and messaging packets related to data storage, retrieval, and maintenance.

As shown, the clients 102, 104, 106, and 108 are connected to a local area network, or LAN 110. A plurality of metadata servers 120, 125 are also connected to the LAN 110 and to a distributed storage system, which may take the form of a storage area network, or SAN 130. The metadata servers 120, 125 may each have components such as a processor, random access memory (RAM), an internal hard disk drive, a network interface card (NIC), and various I/O controllers. If desired, the metadata servers 120, 125 may cooperate to provide a server cluster. Alternatively, only a single metadata server 120 or 125 may be used. An administrator workstation (not shown) may also be connected to the LAN 110, and may have specialized software and/or access to control policy implementation over the network 100.

A metadata disk pool 140 may be connected to the metadata servers 120, 125 through a LAN or, as shown, through the SAN 130. A plurality of storage pools, including a first storage pool 150, a second storage pool 152, a third storage pool 154, and a fourth storage pool 156 are also shown connected to the SAN 130. The storage pools each contain one or more storage devices and may vary in storage type, configuration, location, accessibility, etc. The metadata disk pool 140 stores data related to the operation of the data management system, in a manner that will be shown and described in greater detail below. The storage pools 150, 152, 154 provide file storage to the clients 102-105.

In one embodiment, the SAN 130 is a local area network in which the metadata servers 120, 125, the metadata disk pool 140, and the storage pools 150, 152, 154 are housed within the same facility or campus. In another embodiment, the SAN 130 is a wide area network with at least some of the clients 102, 104, 106, 108, the metadata server 125, the metadata disk pool 140, and the storage pools 150, 152, 154 housed in geographically disparate locations.

The metadata disk pool 140 may be a single hard drive, a RAID system, or the like. Alternatively, the metadata disk pool 140 may include multiple physical storage units, which may be housed in separate locations. Depiction of the metadata disk pool 140 as a single unit in FIG. 1 is by way of example, only. Similarly, the storage pools 150, 152, 154 are depicted as discrete physical units only by way of example. If desired, one physical unit may contain multiple storage pools, and a single storage pool may be spread over multiple physical units. Virtual logical unit numbers (LUNs) may be used as part of a particular storage pool.

The storage pools 150, 152, 154 may comprise a plurality of storage types. For example, a first storage pool 150 in one embodiment comprises a high capacity hard drive. The first storage pool 150 may be comparatively slow, and may have a relatively lower probability of successful data recovery in the event of hardware damage, due to the lack of redundant storage hardware. Consequently, the first storage pool 150 may be most suitable for files that do not need to be accessed and transferred rapidly, and that are not critical to users of the network 100.

A second storage pool 152, by way of example, may comprise a RAID system of hard drives, with a comparatively fast, cached input/output system. Thus, the second storage pool 152 provides higher speed and greater disaster recoverability than the first storage pool 150. The second storage pool 152 may store data in a non-mirrored format. The first and second storage pools 150, 152 may be stored in a common facility, which may be designated "Building A."

A third storage pool 154, by way of example, may comprise a RAID system of hard drives, with a fast input/output system and a mirrored data storage format. The third storage pool 154 may thus provide the greatest disaster recoverability in addition to rapid file access and data transfer. The third storage pool 154 may be somewhat slower than the second storage pool 152 due to the time required for data mirroring. In the alternative, the third storage pool 154 may include additional hardware, such as caching or an integrated processor, to enable the third storage pool 154 to access and transfer data more rapidly than the second storage pool 152.

Some storage pools, such as the third storage pool 154 may be stored at a facility separate from that of the first and second storage pools 150, 152; for example, the third storage pool 154 may be located in "Building B." Building B is separated from Building A by a distance sufficient to ensure that a single disaster will not destroy both the second storage pool 152 and the third storage pool 154. One of the pools 156 may also comprise a tape backup. While four storage pools are depicted, it should be noted that any number of storage pools may be employed under the present invention.

The determination of which of the storage pools 150, 152, or 154 is to be used to store a particular file is preferably made selectively, so that more important files are more rapidly accessible and more likely to be fully recovered in the event of a hardware failure. Furthermore, the network 100 is preferably able to intelligently allocate the resources of the network 100, so that more important operations receive priority over less important ones. Such determinations may be made through the use of policy based data management, as will be shown and described in greater detail in connection with FIG. 2.

The network 100 of FIG. 1 is only one embodiment of a network in which the principles of the present invention may be utilized and is given by way of example only. It should be readily recognized that policy based data management may be applied to a variety of different system types, including LANs, WANs, and SANs, and combinations thereof. Components of such a system maybe connected by a plurality of intermediate components known in the art, such as switches, routers, hubs, and bridges. File servers may or may not be utilized in the data paths of such networks. Policy based data management may also be used with components connected via the Internet.

Figure 2:
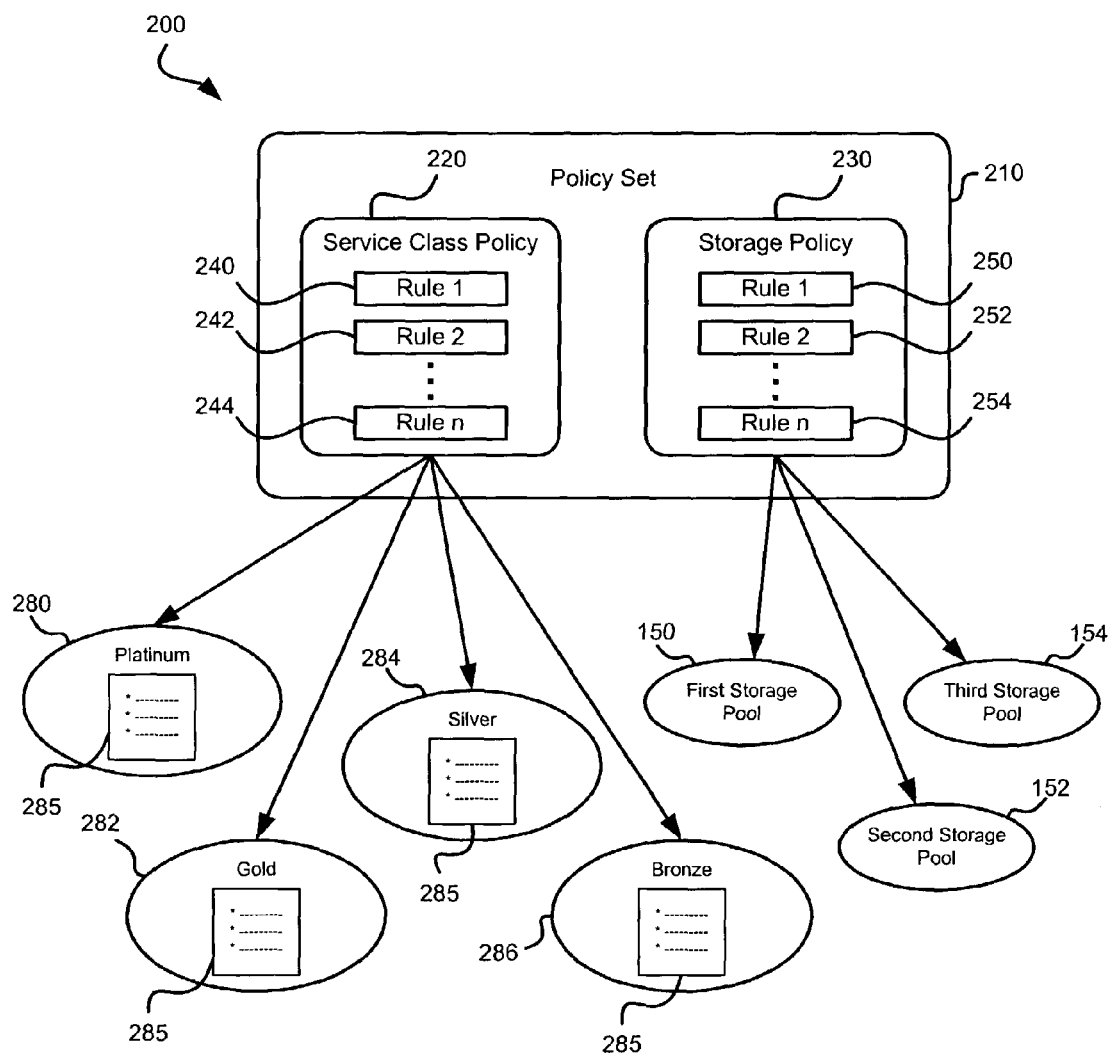
FIG. 2 is a schematic block diagram illustrating one embodiment of a policy set used to select a service class and storage pool for the network of FIG. 1.

Referring to FIG. 2, a schematic block diagram is shown illustrating one concept of a policy implementation 200 suitable for a network such as the network 100. Policy based management is carried out through the use of a policy set 210. The policy set 210 may include several different types of policies. In the policy implementation 200 of FIG. 2, the policy set 210 is applied with respect to files. Hence, attributes of each file are used to classify the file according to the policy set 210. Such attributes may include the file name, the file extension (which often indicates the file type), the container administrative name, the file owner, the group name of the file owner, the system ID of the workstation or server sending the file, and the dates and times of file creation, access, and modification, etc. Other file attributes may also be used to aid policy-based data management.

The policy set 210 may include multiple policies of each type to accommodate the changing priorities caused by business rules or cycles. Thus, when priorities on the network 100 change, a different policy may be implemented accordingly. For example, it may be desirable to shift file priorities for end-of-year processing carried out by one or more of the clients 102, 104, 106, 108. Thus, the network administrator may activate a different policy or set of policies to give higher priority to the files to be processed. Only one policy is active for each policy type at any given time, however.

In the depicted embodiment, the policy set 210 includes a service class policy 220 and a storage pool policy 230. The service class policy 220 includes at least one service class rule that dictates what service class is applied to a file with a given attribute. For example, the service class policy 220 includes a first rule 240, a second rule 242, and other rules through an nth rule 244. Any number of rules may exist between the second rule 242 and the nth rule 244. Each of the rules 240, 242, 244 in one embodiment comprises a statement such as "If a given file attribute is X, the file receives service class Y."

The storage policy 230 similarly has at least one storage pool rule that dictates which of the storage pools 150, 152, 154 should receive a file with a given attribute. For example, the storage policy 230 may have a first rule 250, a second rule 252, an nth rule 254, and any number of rules between the second rule 252 and the nth rule 254.

The service class policy 220 is used to select from among a plurality of service classes, such as the service classes 280, 282, 284, 286, and the storage policy 230 is used to select from among a plurality of storage pools, such as the storage pools 150, 152, 154 depicted in FIG. 1. The service class may be a factor in determining the appropriate storage pool. The service classes in one depicted embodiment comprise hierarchical classes including, by way of example, a platinum service class 280, a gold service class 282, a silver service class 284, and a bronze service class 286. In this example, the platinum service class 280 has the highest priority, followed by the gold service class 282, the silver service class 284, and finally, the bronze service class 286. Of course, any number of service classes may be used, and the service classes need not be hierarchical. Each service class may be made up of any number of static or dynamic file treatment rules or operational requirements.

Examples of possible operational requirements include the times within which file operations must be completed by the network 100. In the alternative, each of the service classes 280, 282, 284 286 may specify a portion of system resources that is to be reserved for operations with the file having that service class 280, 282, 284, or 286 when the file is in use.

As another alternative, a portion of the system resources may be allocated for operations with files of each of the service classes 280, 282, 284, 286. Thus, for example, 35% of the cache capacity may be reserved for files having the platinum service class 280, and the 35% may be equally or otherwise apportioned between all open files with the platinum service class 280. As yet another alternative, a system of absolute priority may be used, in which operations for files with lower service classes must always wait for resources to be released by files with higher service classes.

In other embodiments, the service classes may specify different resource requirements. For example, one service class may be used for files that require a large amount of caching, while another is for files that should not be cached, but may require significant amounts of RAM. Database files, for example, may perform better without external caching because many databases include their own caching. Another service class may be used for data that must be highly recoverable in the event of a catastrophe, but does not require a high level of performance during use. A service class may thus be used to specify particular resource requirements, rather than a general level of priority.

Returning to FIG. 2, the storage pools 150, 152, 154 may be somewhat hierarchical in terms of their access speed, data transfer rate, and data recoverability. However, these specifications need not vary in the same manner between the storage pools 150, 152, 154. For example, one of the storage pools 150, 152, 154 may have the highest data transfer rate while another has the best likelihood of data recovery in the event of a disaster. This is because a given file may only require rapid access or reliable disaster recoverability. Multiple storage pools can also be simultaneously selected for storage of a file to provide extra disaster recoverability.

Optionally, the storage policy 230 may be designed to select the storage pool 150, 152, and/or 154 based solely upon the applicable service class 280, 282, 284, or 286. The storage pool policy 230 may then have only one storage pool rule 250, 252, 254 per service class 280, 282, 284, 286. For example, all files with the bronze service class 286 may be stored in the first storage pool 150, while files with the silver service class 284 are stored in the second storage pool 152 for greater speed and data recoverability. Under this example, files with the gold service class 282 may be stored in the third storage pool 154 for yet greater speed and data recoverability.

Further to this example, files with the platinum service class 280 may be stored in pools such as the second and third storage pools 152, 154 for the highest data recoverability and speed. Identical copies of the file are stored at Building A and Building B. Thus, even if Building A or Building B is destroyed by fire or another catastrophe, the copy at the other building remains intact. File transfer speed may also be enhanced through the storage of redundant copies, for example, within a single storage pool 150, 152, or 154 because different parts of the file may be simultaneously retrieved from the storage pool 150, 152, or 154 to reduce the time required to retrieve the entire file.

Use of the storage pool policy 230 may be desirable to permit storage pool selection based on criteria different from those used to select the service class 280 282, 284, or 286. For example, the files that are to receive the highest priority on resources of the network 100 may not necessarily be the ones that have to be stored with the highest probability of successful recovery. Thus, selection of the storage pool 150, 152, or 154 may be made completely independently of the service class 280, 282, 284, or 286, or with only partial reference to the service class 280, 282, 284, or 286.

The storage pool rules 250, 252, 254 may also be expanded to provide any desired storage parameters. For example, the storage pool rules 250, 252, 254 may be used to more specifically define storage for hierarchical storage management (HSM) systems and the like.

The policy set 210 may be applied in a wide variety of ways within a network. One possible mode of application will be shown and described in connection with FIGS. 3 and 4, with reference to the exemplary network 100 of FIG. 1.

Figure 3:
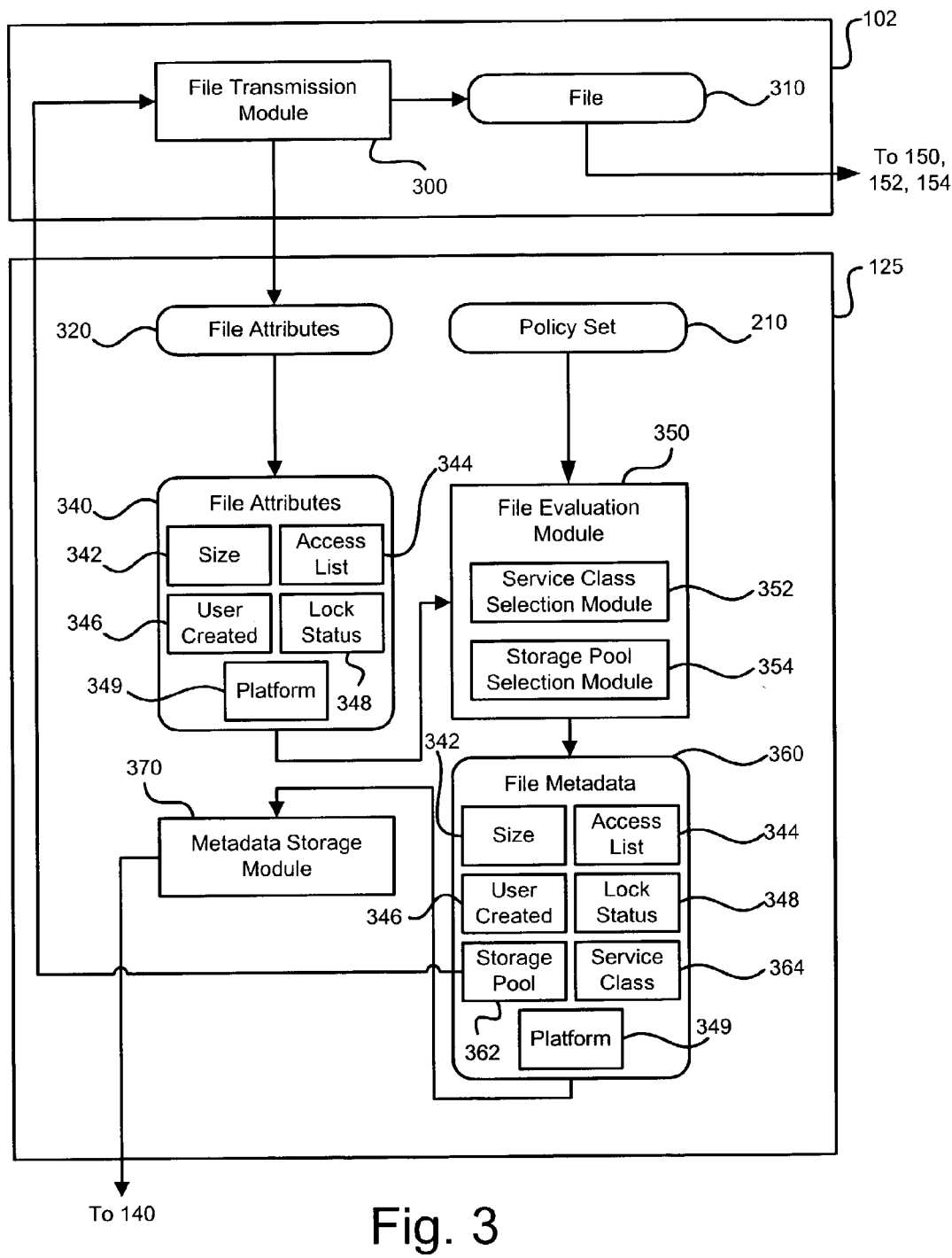
FIG. 3 is a schematic block diagram illustrating one embodiment of executable modules and data structures within the client and metadata server of the network of FIG. 1.

Referring to FIG. 3, a schematic block diagram is shown illustrating executable modules and data structures for implementing file storage and classification within the network 100 of FIG. 1. By way of example, the executable modules and data structures are shown as residing within the client 102 and the metadata server 125; however, those of skill in the art will recognize that any suitable combinations of components and modules of the network 100 may be used to perform the stated functions of the present invention.

The client 102 in this embodiment communicates with the metadata server 125 to request a pool for storage of a new file on the SAN 130. Thus, for example, the client 102 is provided with a file transmission module 300 configured to transmit a new file 310 to the SAN 130 for storage. The file 310 may be formatted according to a variety of different computing platforms, since multiple such platforms may coexist within the network 100.

Prior to storage, the file 310 must be assigned a service class and storage pool by the metadata server 125. Accordingly, the client 102 thus transmits file attributes 320 of the file 310 to the metadata server 125. The file attributes 320 may be in a standardized format such as a text file when they reach the metadata server 125.

The attributes 340 may include items such as designations of the size 342 of the file 310 (i.e., the space required to store the file 310), and an access list 344 of the file 310 (i.e., the persons or workstations that are able to access the file 310). The attributes 340 may also include designations of the user 346 who created the file 310, the lock status 348 of the file 310 (i.e., whether read, write, or read/write access to the file 310 is restricted due to security issues or contemporaneous use of the file 310 by another user), and the platform 349 in which the file 310 is formatted.

The file attributes 340 are preferably received by a file evaluation module 350, which utilizes the file attributes 340 to apply the policy set 210. More precisely, the file evaluation module 350 may comprise a service class selection module 352 that uses the service class policy 220 to select a service class 280, 282, 284, or 286 for the file 310. Hence, the service class selection module applies the rules 240, 242, 244 of the service class policy 220 to the file attributes 340 to determine which of the service classes 280, 282, 284, 286 is appropriate for the file 310. When the service class selection module 352 determines that the file attributes 340 satisfy the requirements of a rule, the service class selection module 352 assigns the corresponding service class 280, 282, 284, 286 to the file 310.

Additionally, the file evaluation module 350 may comprise a storage pool selection module 354 that uses the storage policy 230 to select one or more of the storage pools 150, 152, 154 for storage of the file 310. The storage pool selection module 354 applies the rules 250, 252, 254 of the storage policy 230 to the file attributes 340 to determine which of the storage pools 150, 152, 154 should receive the file 310. The various capabilities and characteristics of the storage pools are preferably taken into account in doing so. When the storage pool selection module 354 determines that the file attributes 340 satisfy the requirements of a rule, the storage pool selection module 354 assigns the corresponding storage pool(s) 150, 152, and/or 154 to the file 310.

The file evaluation module 350 in one embodiment returns a set of file metadata 360 corresponding to the file 310. The file metadata 360 may include all the items from the file attributes 340, including designations of the file size 342, the access list 344, the user 346 who created the file 310, the lock status 348 of the file 310, and the platform 349 in which the file 310 is formatted.

Additionally, the file metadata 360 may include a storage pool designation 362 that specifies which of the storage pools 150, 152, 154 were selected to receive the file 310, and possibly the precise location of the selected storage pool(s) in which the file 310 is to be stored. Furthermore, the file metadata 360 may include a service class designation 364 that specifies which of the service classes 280, 282, 284, 286 was selected for the file 310. The storage pool and service class designations 362, 364 will be used subsequently in the file retrieval and usage process. If desired, the service class designation 364 may also include specific information related to the selected service class 280, 282, 284, or 286, such as the recoverability (availability), performance, and allocation scheme (i.e., sparse versus dense storage) requirements pertaining to the service class 280, 282, 284, or 286. In some cases, specific storage rules may be returned in lieu of the storage class. These cases include default rules and storage rules of high priority.

The file metadata 360 may then be stored by a metadata storage module 370. Metadata for files may all be stored in one location that is easily accessed by the metadata server 125. The network 100 of FIG. 1 provides such a location in the form of the metadata disk pool 140. In the alternative, the file metadata 360 may be appended to the file 310 and stored with the file, in the selected storage pool(s) 150, 152, and/or 154.

The file 310 may be stored by the file transmission module 300. The file transmission module 300 preferably receives the storage pool designation 362 from the file metadata 360, and routes the file 310 to the corresponding storage pool(s) 150, 152, 154 for storage.

Figure 4:
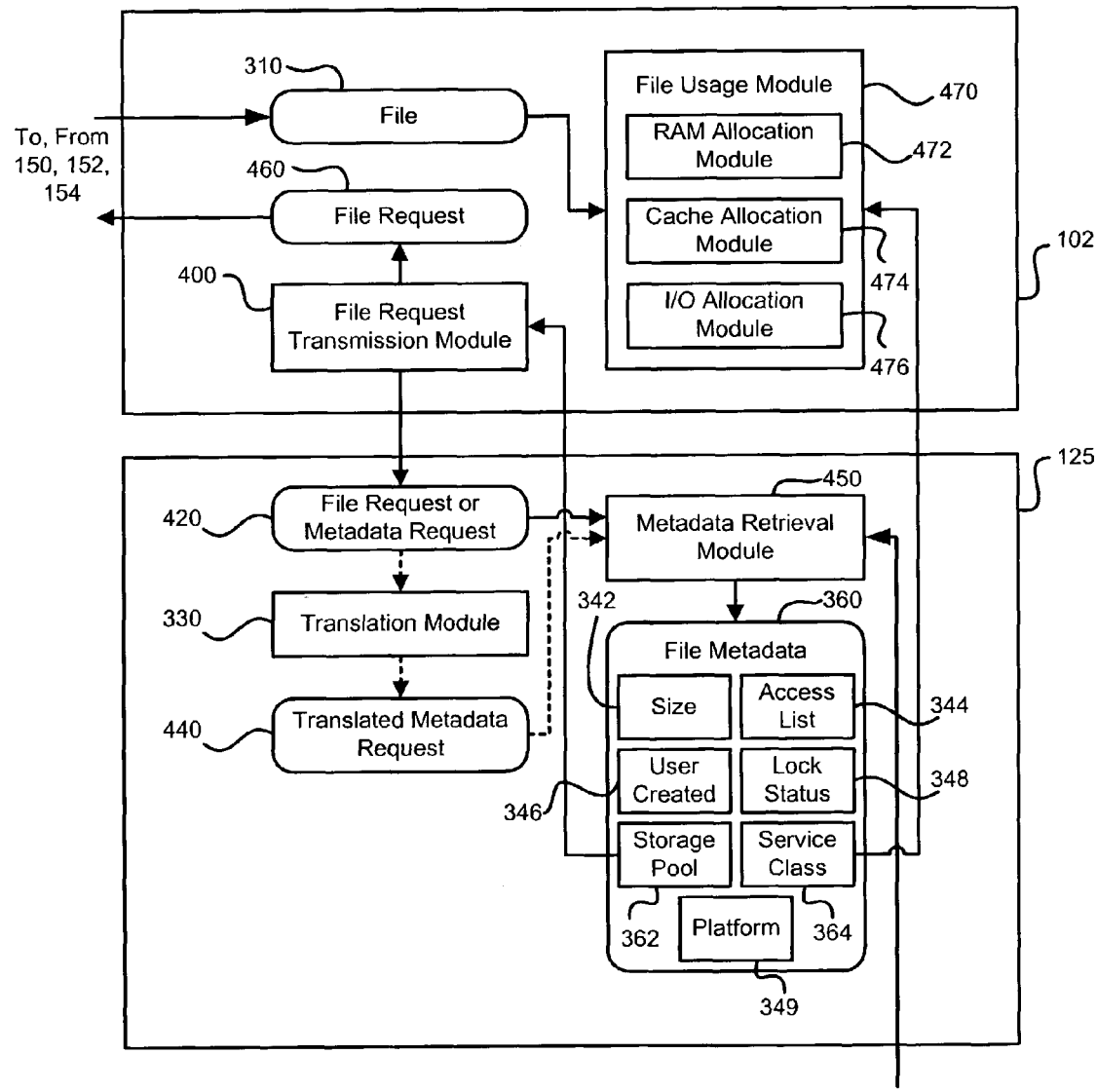
FIG. 4 is a schematic block diagram illustrating additional embodiments of executable modules and data structures within the client and metadata server of the network of FIG. 1.

Referring to FIG. 4, a schematic block diagram is shown illustrating executable modules and data structures for implementing file retrieval and usage within the network 100 of FIG. 1. As with FIG. 3, the executable modules and data structures are shown as residing within the client 102 and the metadata server 125. Nevertheless, the executable modules and data structures of FIG. 4 may be located in any suitable combination of modules and components of the network 100.

The client 102 preferably communicates with the metadata server 125 to request retrieval of the file 310 from the SAN 130. Hence, the client 102 may be provided with a file request transmission module 400 configured to transmit a metadata request 420 to the metadata server 125. According to one embodiment, the metadata request 420 is received from the client 102 in a universal format, such as a text file, readable by the metadata server 125. Preferably, the communication between the clients 102-108 and the metadata server 125 are conducted using a text file format that is readily understood regardless of operating system. Nevertheless, in some embodiments, other communication protocols may be used that make translation necessary. Accordingly, a translation module 330 may be supplied to translate the metadata request 420 into a translated metadata request 440.

A metadata retrieval module 450 receives the metadata request 420 or 440 and retrieves the file metadata 360 for the requested file 310 from the metadata disk pool 140. The file metadata 360 in one embodiment includes the storage pool designation 362, which in this embodiment is used by the file request transmission module 400 to transmit a file request 460 to the SAN 130. The file 310 is located and retrieved from the designated storage pool 150, 152, or 154. As mentioned previously, the file 310 may be stored on multiple physical drives within a storage pool 150, 152, or 154, and may thus be simultaneously retrieved from multiple physical drives to expedite retrieval.

The client 102 receives the file 310 as well as the service class designation 364 from the file metadata 360. The client 102 may then "enforce" the service class designation 364 during file access by allocating the proper proportion of resources of the client 102 and/or other parts of the network 100 for operations involving the file 310. The client 102 may have a file usage module 470 that performs this function.

The file usage module 470 is, in one embodiment, provided with a RAM allocation module 472 that is configured to determine and sets aside the appropriate amount of random access memory for operations involving the file 310. Similarly, a cache allocation module 474 is preferably provided and configured to determine and set aside the appropriate amount of caching space for operations involving the file 310. By the same token, an I/O allocation module 476 is preferably provided and configured to set aside the desired input/output bandwidth for transfers involving the file 310. If desired, processor power or other resources of the client 102 may be allocated in a similar manner.

The file usage module 470 in one embodiment is configured to communicate with subsystems of the client 102 to allocate resources. For example, the client 102 may include devices such as one or more FC, SSA, or iSCSI controllers, which may be configured to receive instructions regarding I/O bandwidth allocation. The I/O allocation module 476 thus allocates I/O bandwidth by sending corresponding instructions to the controller(s).

The service class 364 may also be conveyed to clients that are not directly connected to the LAN 110, such as workstations connected to the client 102. The service class 364 may thus be used to control resource allocation for a variety of devices not shown in FIG. 1. In addition, the SAN 130 may have components such as switches that are designed to receive and utilize service class information for prioritization; hence, the service class 364 may also be conveyed to the SAN 130 itself for further implementation.

According to one alternative embodiment of the invention, the network 100 may be configured in such a manner that the clients 102, 104, 106, 108 are only able to communicate with the SAN 130 through the metadata server 125. Thus, a file 310 to be stored may be transmitted, in its entirety, to the metadata server 125, which then assigns one or more storage pools 150, 152, and/or 154 and a service class 280, 282, 284, 286 as in FIG. 3. The metadata server 125 then transmits the file 310 to the appropriate storage pool(s) 150, 152, and/or 154. Similarly, in order to retrieve the file 310, the client 102 may transmit the metadata request 420 and the file request 460 to the metadata server 125, which retrieves the file metadata 360, including the storage pool designation 362, and retrieves the file 310 from the appropriate storage pool(s) 150, 152, and/or 154.

Storage of the file metadata 360 enables retrieval of the file 310 from the appropriate storage pool(s) 150, 152, or 154 and application of the service class designation 364. The file metadata 360 may be stored according to a variety of schemes, one of which will be shown and described in connection with FIG. 5.

Figure 5:
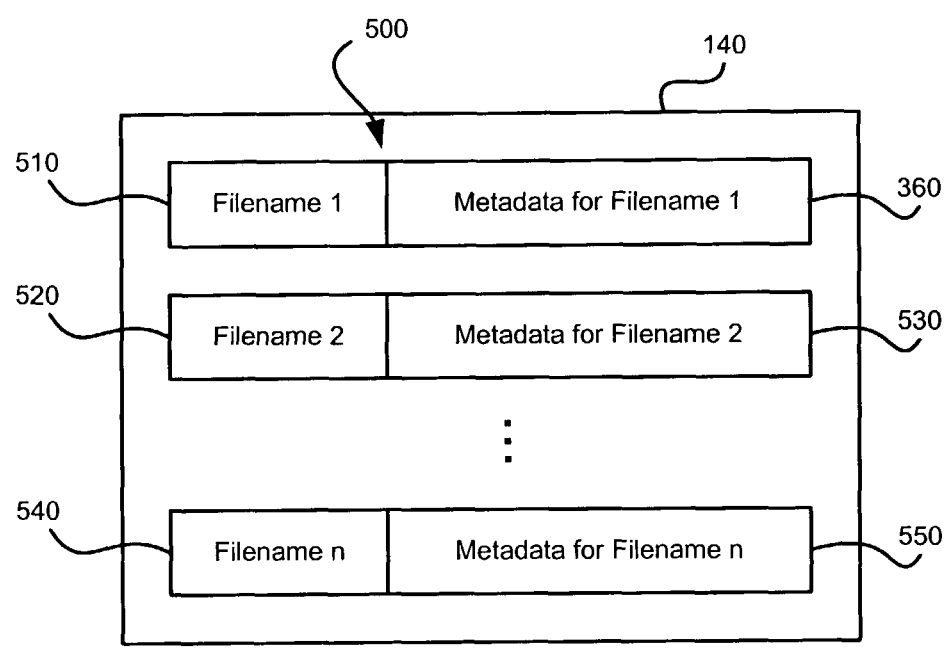
FIG. 5 is a schematic block diagram illustrating one embodiment of data structures within the metadata disk pool of FIG. 1.

Referring to FIG. 5, a schematic block diagram is shown illustrating one embodiment of a database 500 that may be stored in the metadata disk pool 140. The database 500 is presented in one embodiment in the form of a lookup table. Preferably, the database 500 is implemented in a form having a binding arrangement between filenames and the corresponding file metadata.

As shown, the database 500 contains a first filename 510, which is the name of the file 310 in FIGS. 3 and 4. Consequently, the file metadata 360 of FIGS. 3 and 4 is associated with the first filename 510. A second filename 520 has associated file metadata 530, and an nth filename 540 has associated file metadata 550. Additional sets of filenames and file metadata may exist in the database 500 between the second filename 520 with its corresponding metadata 530, and the nth filename 540, with its corresponding metadata 550. The filenames 510, 520, 540 may be sorted alphabetically or in any other manner known to the metadata server 125.

Files may be stored, classified, retrieved, and used according to various suitable methods. One example of a suitable method of storage and classification will be shown and described in connection with FIGS. 6, 7, and 8. An example of a suitable method of retrieval and usage will be shown and described in connection with FIG. 9.

Figure 6:
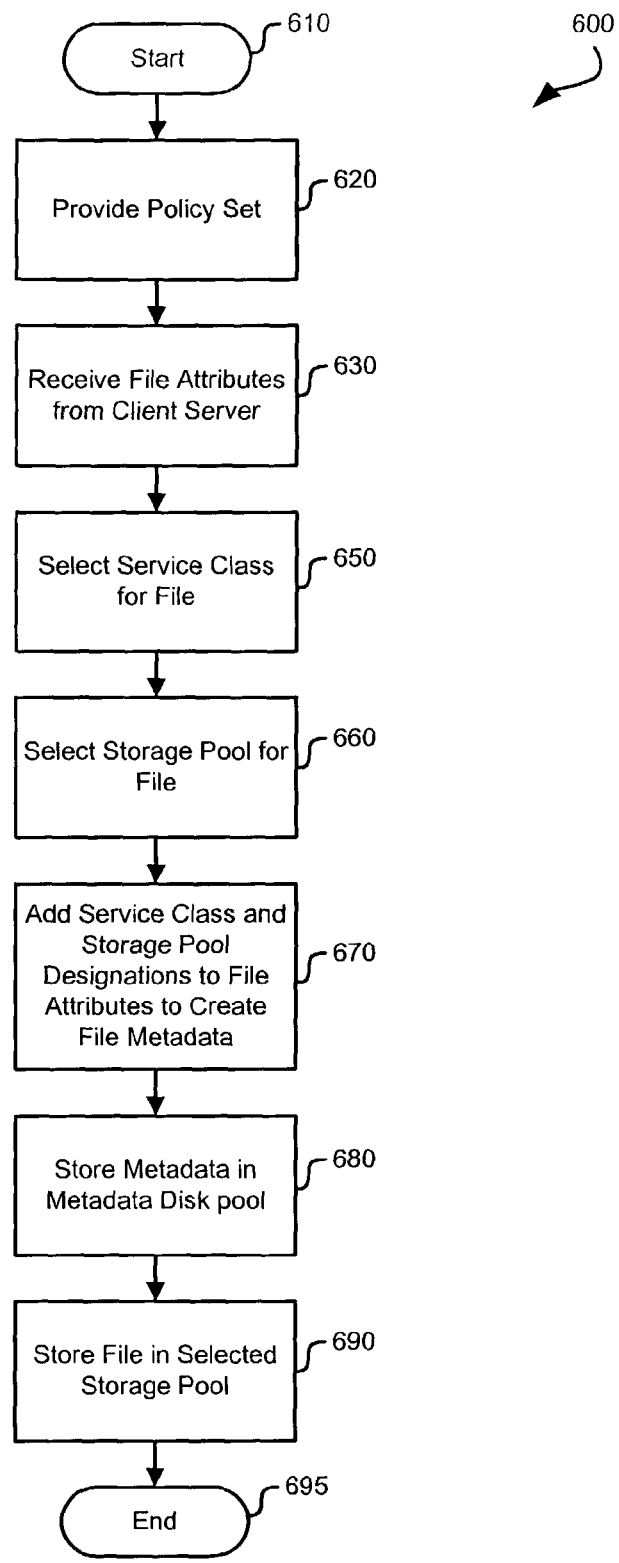
FIG. 6 is a schematic flow chart diagram illustrating one embodiment of a method of storing a file in the network of FIG. 1 and assigning a service class and storage pool to the file.

Referring to FIG. 6, a schematic flowchart diagram is shown depicting one embodiment of a method 600 for storing and classifying a file in a network. The method 600 will be described in connection with the components of the network 100, and with the executable modules and data structures of FIG. 3. However, the method 600 may be used with many alternative network configurations. Additionally, the method of FIG. 6 is only an example; numerous variations exist within the scope of the invention.

The method 600 starts 610 and proceeds with providing 620 the policy set 210. This may be done by a system administrator of the network 100, or simply an administrator of the SAN 130. The system administrator may, for example, select the policy set 210 from a number of policy sets, or may manually define the rules to formulate the policy set 210. Generally, only a single policy set 210 is active at a time, but the policy set 210 may be changed based on the changing needs caused by business rules and cycles, as described previously.

File attributes 340 of the file 310 may then be received 630 from the client 102. The file attributes 320 may be received by the translation module 330 of the metadata server 125, as depicted in FIG. 3.

After the file attributes 340 have been obtained, a service class 280, 282, 284, or 286 is selected 650 for the file 310. This may be performed by the service class selection module 352 of the file evaluation module 350. Similarly, one or more of the storage pool(s) 150, 152, and/or 154 may be selected 660 for the file 310 by the storage pool selection module 354 of the file evaluation module 350.

After the service class 280, 282, 284, or 286 and the storage pool 150, 152, and/or 154 have been selected 650, 660, the storage pool designation 362 and the service class designation 364 are preferably added 670 to the file attributes 340 to provide the file metadata 360. The file metadata 360 may be stored 680 in the metadata disk pool 140. The file 310 may be stored 690 in the storage pool(s) 150, 152, and/or 154, at the location directed by the storage pool designation 362. The method 600 may then end 695.

Selection 650 of the service class 280, 282, 284, or 286 and selection of the storage pool(s) 150, 152, and/or 154 may each involve several steps. These will be shown and described in greater detail in connection with FIGS. 7 and 8.

Figures 7, 8:
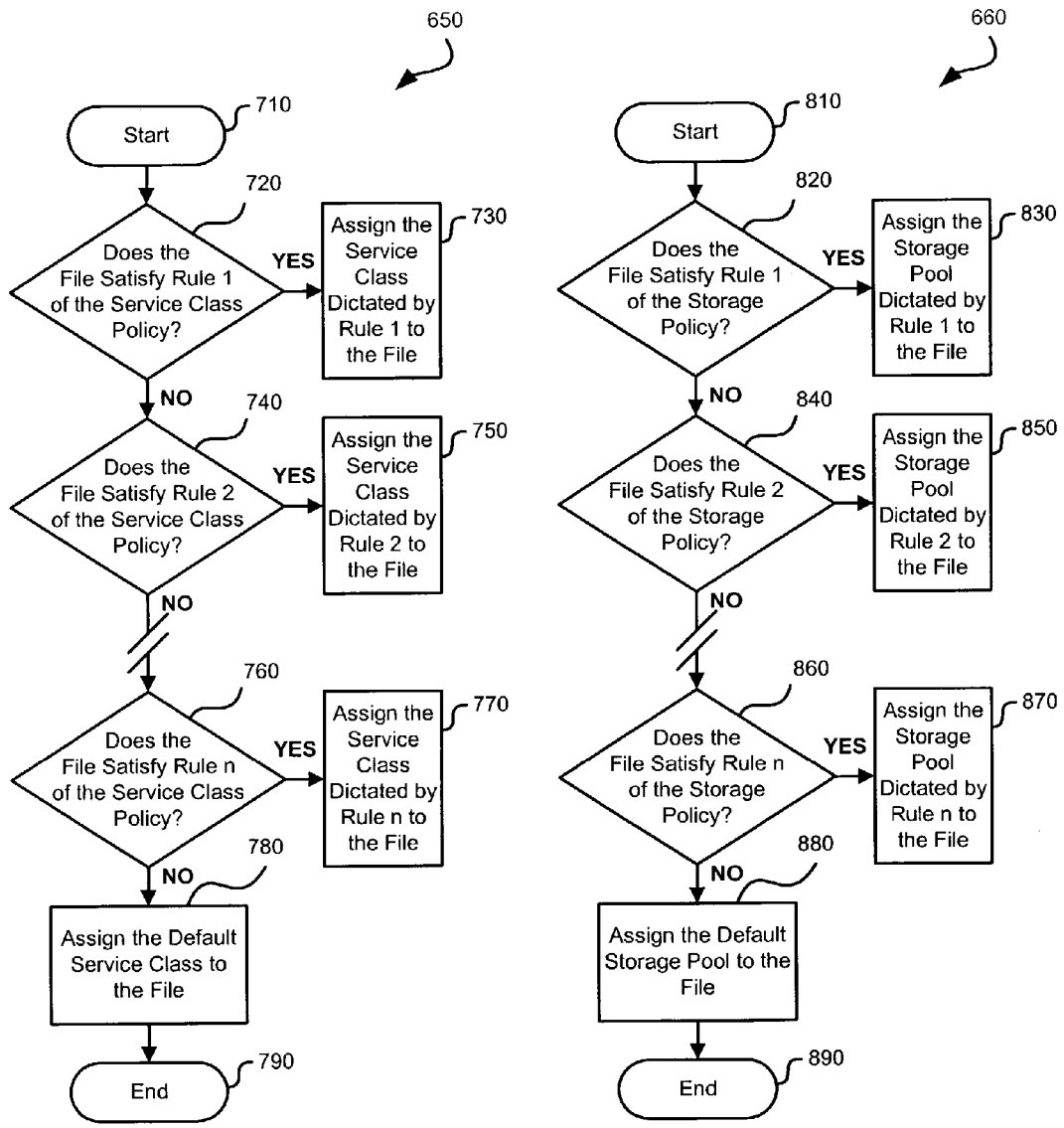
FIG. 7 is a schematic flow chart diagram illustrating one embodiment of a method of selecting the service class within the method of FIG. 6.
FIG. 8 is a schematic flow chart diagram illustrating one embodiment of a method of selecting the storage pool within the method of FIG. 6.

Referring to FIG. 7, a schematic flow chart diagram is shown illustrating one example of a method by which selection 650 of the service class 280, 282, 284, or 286 may be accomplished through the use of the policy set 210. The selection method 650 starts 710 and then proceeds to determine 720 whether the file 310, or more precisely, the file attributes 340, satisfy the first rule 240 of the service class policy 220. If the first rule 240 is satisfied, the service class 280, 282, 284, or 286 dictated by the first rule 240 is assigned 730 to the file 310.

If the first rule 240 is not satisfied, the selection method 650 then determines 740 whether the file attributes 340 satisfy the second rule 242 of the service class policy 220. If the second rule 242 is satisfied, the service class 280, 282, 284, or 286 dictated by the second rule 242 is assigned 750 to the file 310.

If the second rule 242 is not satisfied, the selection method 650 applies the remaining rules between the second rule 242 and the nth rule 244 (indicated by the broken arrow) in FIG. 7. If none of these rules are satisfied, the selection method 650 determines 760 whether the nth rule 244 of the service class policy 220 is satisfied by the file attributes 340. If the nth rule 244 is satisfied, the service class 280, 282, 284, or 286 dictated by the nth rule 244 is assigned 770 to the file 310.

If the nth rule 244 is not satisfied, the selection method 650 assigns a default service class 280, 282, 284, or 286 to the file 310. Since such a case indicates that the service class policy 220 has no rule to accommodate the file 310, a record of assignment of the default service class 280, 282, 284, or 286 may be kept in a system log, which may be maintained within the metadata server 125 or, for example, in the metadata disk pool 140. An administrator may periodically review the log to determine whether new rules need to be added to the service class policy 220 to enable proper handling of files of a type similar to that of the file 310. As soon as a service class 280, 282, 284, or 286 is assigned to the file 310, the selection method 650 terminates 790.

Referring to FIG. 8, a schematic flow chart diagram is shown illustrating one example of a method by which selection 660 of the storage pool(s) 150, 152, and/or 154 may be accomplished through the use of the policy set 210. The selection method 660 generally parallels the selection method 650. The selection method 660 starts 810 and proceeds to determine 820 whether the file 310, or more precisely, the file attributes 340, satisfy the first rule 250 of the storage policy 230. If the first rule 250 is satisfied, the storage pool(s) 150, 152, and/or 154 dictated by the first rule 250 are assigned 830 to the file 310.

If the first rule 250 is not satisfied, the selection method 660 then determines 840 whether the file attributes 340 satisfy the second rule 252 of the storage policy 230. If the second rule 252 is satisfied, the storage pool(s) 150, 152, and/or 154 dictated by the second rule 252 are assigned 850 to the file 310.

If the second rule 252 is not satisfied, the selection method 660 applies the remaining rules between the second rule 252 and the nth rule 254 (indicated by the broken arrow) in FIG. 8. If none of these rules are satisfied, the selection method 660 determines 860 whether the nth rule 254 of the storage policy 230 is satisfied by the file attributes 340. If the nth rule 254 is satisfied, the storage pool(s) 150, 152, and/or 154 dictated by the nth rule 254 is assigned 870 to the file 310.

If the nth rule 254 is not satisfied, the selection method 660 assigns one or more default storage pools 150, 152, and/or 154 to the file 310. As with the selection method 650, a record of assignment of the default storage pool(s) 150, 152, and/or 154 may be kept in the system log. An administrator may periodically review the log to determine whether new rules need to be added to the storage policy 230 to enable proper handling of files of a type similar to that of the file 310. As soon as one or more storage pools 150, 152, and/or 154 are assigned to the file 310, the selection method 660 terminates 890.

The methods 650, 660 depicted in FIGS. 7 and 8 are based on sequential progression through the rules 240, 242, 244, 250, 252, 254. However, in alternative embodiments, different rule analysis methods may be used. For example, a weighting system may be used to assign weights to various rules. A file may then be given one or more scores based on its adherence to the rules, and assigned a service class based on the scores. Thus, the service class 280, 282, 284, or 286 and storage pool(s) 150, 152, and/or 154 may be more intelligently assigned.

Figure 9:
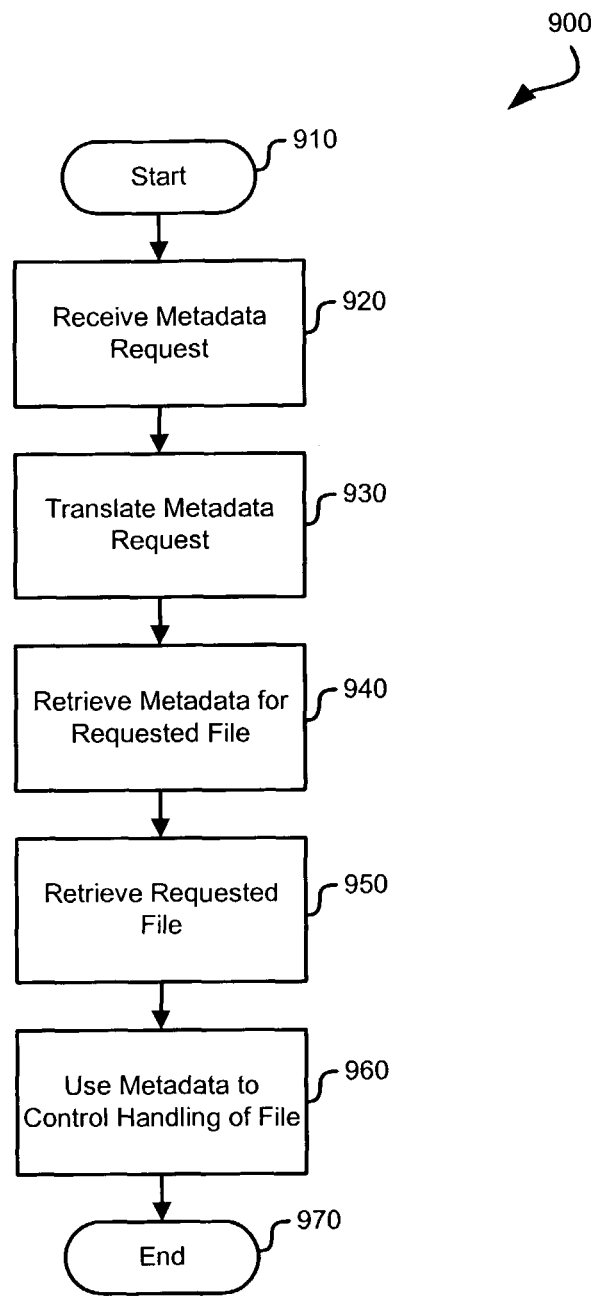
FIG. 9 is a schematic flow chart diagram illustrating one embodiment of a method for retrieving and using a file stored in the network of FIG. 1.

Referring to FIG. 9, a schematic flowchart diagram is shown depicting one embodiment of a method 900 for retrieving and using a file stored in a network. The method 900 will be described in connection with the components of the network 100, and with the executable modules and data structures of FIG. 4. However, the method 900 may be used with many alternative network configurations. Additionally, the method of FIG. 9 is only an example; numerous variations exist within the scope of the invention.

The method 900 starts 610 and proceeds to receive 920 a metadata request 420. As depicted in FIG. 4, the metadata request 420 may be generated by the client 102 and may be received by the metadata server 125. The metadata request 420 may be translated 930 by the translation module 330 to provide the translated metadata request 440 that identifies the requested file 310 in a manner usable by the metadata server 125. This step may also be performed by the client 102, or may not need to be performed, depending on the types of computing platforms that are in use within the network 100.

After the requested file 310 has been identified, the file metadata 360 corresponding to the file 310 is in the depicted embodiment retrieved 940 by the metadata retrieval module 450. Retrieval 940 of the metadata 360 may be performed by locating the filename of the requested file 310 within the database 500 stored on the metadata disk pool 140, and then reading the corresponding metadata.

The requested file 310 is then preferably retrieved 950 from the storage pool(s) 150, 152, 154 in which the file 310 is stored. Retrieval 950 may be performed by receiving the storage pool designation 362 from the file metadata 360 and reading the file 310 from the corresponding location within the assigned storage pool(s) 150, 152, and/or 154. As mentioned previously, if the file 310 is stored on more than one physical drive of a storage pool 150, 152, or 154, different portions of the file 310 may be simultaneously retrieved from the storage pool 150, 152, or 154 containing the file 310. The file 310, along with the service class designation 364, may then be returned to the client 102.

The client 102 may use 960 the metadata 360 to control the manner in which the file 310 is handled. More precisely, the file usage module 470 of the client 102 receives the file 310 and the service class designation 364 and allocates the necessary resources for further operations with the file 310. Usage 960 may include allocating memory with the RAM allocation module 472, allocating caching capacity with the cache allocation module 474, and allocating I/O bandwidth with the I/O allocation module 476. Additionally, usage 960 may entail the variation of a host of other parameters in accordance with the service class designation 364.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A policy-based data management system comprising:
a policy set comprising at least one service class rule;
a file evaluation module configured to apply the service class rule to assign a service class to a file;
a file usage module configured to conduct operations on the file in a manner directed by the service class; and
a communication module operable to communicate between the file evaluation module and a plurality of remote clients and configured to communicate with clients comprising at least two different computing platforms.

2. The policy-based data management system of claim 1, wherein the file evaluation module is further configured to automatically assign the file to a storage pool.

3. The policy-based data management system of claim 1, wherein the file evaluation module is configured to assign the storage pool to the file based on the service class.

4. The policy-based data management system of claim 2, wherein the policy set further comprises at least one storage pool rule, the file evaluation module further configured to automatically apply the storage pool rule to assign the storage pool to the file.

5. The policy-based data management system of claim 2, wherein the storage pool is selected from a group of storage pools of the open systems environment, and the file evaluation module is configured to take the characteristics of the storage pools into account in assigning the file to a storage pool.

6. The policy-based data management system of claim 1, wherein the file usage module is configured to establish at least one of the group consisting of input/output speed, random access memory allocation, performance priority, and cache allocation scheme, based on the service class.

7. The policy-based data management system of claim 1, further comprising a file transmission module configured to provide one or more attributes of the file to the file evaluation module, which is configured to apply the service class rule to the one or more attributes to determine the service class.

8. The policy-based data management system of claim 1, wherein the at least two different computing platforms are selected from the group consisting of Windows, AIX, Linux, Solaris, Unix, Mac OS, OS/2, DOS, HP, IRIX, and OS/390.

9. A metadata server for carrying out policy-based management, the metadata server comprising:
a processor; and
a memory configured to store computer code comprising:
a policy set comprising at least one service class rule;
a file evaluation module configured to apply the service class rule to assign a service class to a file; and
a communication module operable to communicate between the file evaluation module and a plurality of remote clients and configured to communicate with clients of varying computing platforms.

10. The metadata server of claim 9, wherein the file evaluation module is further configured to automatically assign the file to a storage pool.

11. The metadata server of claim 9, further comprising a network interface configured to communicate with a client to transmit a service class to the client to control handling of the file based on the service class.

12. A client for carrying out policy-based management, comprising:
a processor;
a network interface configured to communicate with a metadata server having a policy set comprising at least one service class rule and a file evaluation module configured to apply the service class rule to assign a service class to a file; and
a memory configured to store computer code comprising a file request transmission module configured to request receipt of the file from a storage pool; and
a file usage module configured to control handling of the file based on the service class.

13. The client of claim 12, wherein the memory further comprises a file request transmission module configured to transmit attributes of the one file to the metadata server so that the metadata server can apply the service class rule to the attributes in assigning a service class to the file.

14. The client of claim 12, wherein the file usage module is configured to select at least one of the group consisting of input/output speed, random access memory allocation, performance priority, and cache allocation scheme of the client for a file based on the service class assigned to the file.

15. A method for handling files within a policy-based data management system, the method comprising:
providing a policy set comprising at least one service class rule;
receiving one or more attributes of a file from one of a plurality of clients, the clients comprising at least two different computing platforms;
applying the service class rule to the file to assign a service class to the file; and
conducting operations on the file in a manner according to the service class.

16. The method of claim 15, further comprising assigning a storage pool to the file.

17. The method of claim 16, wherein assigning the storage pool to the file comprises assigning the storage pool to the file based on the at least one service class.

18. The method of claim 16, wherein the policy set further comprises at least one storage pool rule, wherein assigning the storage pool to the file comprises applying the storage pool rule to the characteristics of the available storage pools to assign the storage pool to the file.

19. The method of claim 16, wherein assigning the storage pool to the file comprises selecting the storage pool from a group of storage pools of the open systems environment, the group of storage pools each comprising at least two different disaster recoverability levels.

20. The method of claim 15, wherein controlling handling of the file based on the service class comprises taking action on at least one of the group consisting of input/output speed, random access memory allocation, performance priority, and cache allocation scheme, in a manner in accordance with the service class.

21. The method of claim 15, wherein the service class rule is applied to the one or more file attributes to select the service class.

22. The method of claim 15, wherein the computing platforms are selected from the group consisting of Windows, AIX, Linux, Solaris, Unix, Mac OS, OS/2, DOS, HP, IRIX, and OS/390, wherein the method further comprises translating the one or more attributes.

23. A storage device storing computer code executable by a processor to carry out a method comprising:
providing a policy set comprising at least one service class rule;
receiving one or more attributes of a file from one of a plurality of clients, the clients comprising at least two different computing platforms;

applying the service class rule to the file to assign a service class to the file; and conducting operations on the file in a manner according to the service class.

24. The storage device of claim 23, wherein the computer code is further configured to assign a storage pool to the file.

25. The storage device of claim 23, wherein the service class rule bases selection of the service class on the one or more file attributes.

26. A policy-based data management system for an open systems environment, the system comprising:

at least one service class rule;

means for applying the service class rule to assign a service class to a file;

means for controlling handling of the file based on the service class;

means for communicating with a plurality of clients comprising at least two different computing platforms.

27. The policy-based data management system of claim 26, further comprising means for assigning a storage pool to the file based on attributes of the file.

\* \* \* \* \*